Patented May 24, 1927.

1,629,962

UNITED STATES PATENT OFFICE.

JAMES S. PERRY, OF COVINA, CALIFORNIA; ELSIE W. PERRY SPECIAL ADMINISTRATRIX OF JAMES S. PERRY, DECEASED.

METHOD OF TREE TREATMENT.

No Drawing. Application filed November 10, 1925. Serial No. 68,218.

This invention relates to tree treatment and more particularly to that form of tree surgery which is adapted to cure certain diseases of trees, notably found in trees of the citrus class, known as psorosis or scaly bark and gummosis. Psorosis causes the bark to scale from the tree and if not stopped will spread all over the bark and kill the tree. Citrus trees, such as orange trees, which have matured, are valuable, being worth as high as five hundred dollars apiece, and because of this fact and likewise because of the number of years that it requires to bring a tree to a matured state so that it bears fruit, it becomes necessary to closely inspect citrus trees regularly for psorosis, as well as other diseases and conditions.

Just what causes psorosis is not generally known, but it is believed to be caused by some animal organism which affects the bark very much the same as a cancerous eczema condition of the skin affects a human being.

The invention has for an object the provision of a method of curing a tree of psorosis and within a minimum of time from the time the disease is first discovered. Another object is the provision of a method of treating diseased trees which is highly efficient, inexpensive, and which may be carried out quickly and which when once carried out or performed will not require a great deal of further attention.

Whereas certain methods now in use for treatment of psorosis requires many months for the tree to heal, the present invention only requires a few days, usually not more than twenty-one, for a given condition of psorosis to be completely cured.

In practicing the invention and assuming that some variety of tree of the citrus family, such as an orange tree, has become infected with psorosis, I first examine the diseased area of the tree and then scrape the diseased bark enough to expose the diseased portion to view, likewise so as to be able to discover the extent of the disease, that is, the amount of spread of such disease. I then cut around a given area of the bark down to the cambium and strip the bark within the cut area from the tree. After this operation I examine the bark for several inches outward from the cut area to discover whether or not the bark is diseased further, and if it is, I make further cuts so as to remove all diseased portions of the bark. The appearance of the tree after the operation is performed shows a cut area in the tree from which the bark has been removed down to the cambium and a portion outward from the cut area which has been scraped enough to discover any trace of further disease.

In order to combat the disease and likewise to keep the cambium in a moist condition, I immediately spray the treated area with some disinfectant, and I have found that corrosive sublimate in a solution of water, say, 1/1000 part of the corrosive sublimate to water, may be used. Other disinfectants may be efficiently employed as long as they are not of great strength, as the disinfectant must not unduly burn the surface of the cambium. While the cambium is in a moist condition I wrap loosely around the tree and over the wound, paper such as newspaper, wax paper, cloth or the like. It is preferable to keep the paper or cloth out of direct contact with the cambium. The paper or cloth apparently protects the cambium and does not allow the same to dry out rapidly and likewise protects the cut away area from direct contact with sunlight and air, as well as any disease germs that may be in the air. I am aware that prior investigators have attempted to treat psorosis by removing the diseased bark down to the cambium and then usually applying a wax directly to the cambium. However, the resultant new bark does not cover the cut-away area, the bark only growing in spots. With my method of treating psorosis I have found that the bark grows uniformly and completely covers the cambium and that new bark is well grown within twenty-one days.

The invention is also applicable to the treatment of a disease known as shell bark affecting lemon trees by employing the same sequence of steps as above outlined. I do not wish to confine this invention to the treatment of citrus trees alone, as the invention can be applied to any tree suffering from psorosis or kindred or like diseases.

It is obvious that various minor changes may be made in carrying out the invention, without departing from the true spirit of the invention.

Having thus disclosed my invention, I claim and desire to secure by Letters Patent:

A method of treating diseased bark conditions in trees which consists in first removing the diseased area of the bark down to the cambium, then applying a germicidal solution to the exposed cambium, then placing a cover about and spaced from the cambium while in a moist condition, and finally leaving the covering in position until new bark has been grown.

In testimony whereof, I have signed my name to this specification.

JAMES S. PERRY.